(12) United States Patent
Staroselsky et al.

(10) Patent No.: US 7,041,154 B2
(45) Date of Patent: May 9, 2006

(54) ACOUSTIC FUEL DEOXYGENATION SYSTEM

(75) Inventors: Alexander Staroselsky, Avon, CT (US); Igor I. Fedichenia, West Hartford, CT (US); Foster Philip Lamm, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 230 days.

(21) Appl. No.: 10/735,200

(22) Filed: Dec. 12, 2003

(65) Prior Publication Data

US 2005/0126391 A1 Jun. 16, 2005

(51) Int. Cl.
*B01D 61/58* (2006.01)
*B01D 19/00* (2006.01)
(52) U.S. Cl. .................. 95/30; 95/46; 96/6; 96/175
(58) Field of Classification Search .............. 95/30, 95/46; 96/175, 6
See application file for complete search history.

(56) References Cited

U.S. PATENT DOCUMENTS

| | | |
|---|---|---|
| 4,776,536 A | 10/1988 | Hudson et al. |
| 5,275,000 A | 1/1994 | Coffinberry et al. |
| 5,423,178 A | 6/1995 | Mains |
| 5,570,580 A | 11/1996 | Mains |
| 5,604,297 A | 2/1997 | Seiden et al. |
| 5,939,174 A | 8/1999 | Satoh |
| 6,026,644 A | 2/2000 | Ito et al. |
| 6,244,738 B1 | 6/2001 | Yasuda et al. |
| 6,315,815 B1 | 11/2001 | Spadaccini et al. |
| 6,576,357 B1 | 6/2003 | Helmolt |
| 2001/0015135 A1* | 8/2001 | Chybin et al. .......... 96/165 |
| 2003/0061939 A1* | 4/2003 | Hutton et al. .......... 96/175 |
| 2003/0221678 A1* | 12/2003 | Kelemencky ............ 123/536 |

FOREIGN PATENT DOCUMENTS

| | | | |
|---|---|---|---|
| JP | 4197433 | | 7/1992 |
| JP | 05092103 A | * | 4/1993 |

OTHER PUBLICATIONS

D.E. Yount, E.W. Gillary, and D.C. Hoffman, "A Microscopic Invenstigation of Bubble Formation Nuclet", Journal of Acoustical Society of America, Nov. 1984, pp. 1511-1521.

L.J. Spadaccini, H. Huang, "On-Line Fuel Deoxygenation for Coke Suppression", Journal of Engineering for Gas Turbines and Power, Jul. 2003, vol. 125, pp. 1-7.

Abraham D. Stroock, Stephan K. W. Dertinger, Armand Ajdari, Igor Mezic, Howard A. Stone, George M. Whitesides, "Chaotic Mixer for Microchannels", Science, vol. 295, Jan. 25, 2002, pp. 647-651.

Csaba Suri, Katsuhide Takenake, Yoshihiro Kojima and Kiyohito Koyama, "Experimental Study of a New Liquid Mixing Method Using Acoustic Streaming", Journal of Chemical Engineering of Japan, vol. 35, No. 6, pp. 497-502 2002.

* cited by examiner

*Primary Examiner*—Duane Smith
*Assistant Examiner*—Douglas J. Theisen
(74) *Attorney, Agent, or Firm*—Carlson, Gaskey & Olds

(57) ABSTRACT

A fuel system for an energy conversion device includes a deoxygenator system. A signal generator system includes a multiple of transducers located adjacent a fuel channel. The transducers are arranged to generate acoustic flow chaotization and cavitation-induced phase separation which destroys oxygen depleted boundary layers and significantly improving flow mixing, intensifying oxygen supply to the surface of an oxygen-removing membrane of the deoxygenator system.

16 Claims, 2 Drawing Sheets

ACOUSTIC FUEL DEOXYGENATION SYSTEM

BACKGROUND OF THE INVENTION

The present invention relates to the removal of dissolved oxygen from fuels, and more particularly to acoustic induced flow mixing and gas cavitation.

Hydrocarbon jet fuel significantly increases its heat capacity if it is heated up. The presence of dissolved oxygen in jet fuels may be objectionable because it supports oxidation reactions that yield undesirable by-products. Dissolution of air in jet fuel results in an approximately 70 ppm oxygen concentration. When aerated fuel is heated between 350° F. and 850° F. the oxygen initiates free radical reactions of the fuel resulting in deposits commonly referred to as "coke" or "coking." Coke may be detrimental to the fuel lines and may inhibit combustion. The formation of such deposits may impair the normal functioning of a fuel delivery system, either with respect to an intended heat exchange function or the efficient injection of fuel.

Typically, lowering the oxygen concentration to approximately 2 ppm is sufficient to overcome the coking problem. Various conventional fuel deoxygenation techniques are currently utilized. One conventional Fuel Stabilization Unit (FSU) utilized in the aircraft field removes oxygen from jet fuel by inducing an oxygen pressure gradient across a membrane permeable to oxygen. Although quite effective, the rate of degassing is proportional to the gas concentration at the sub surface membrane layer, which is determined by the diffusion rate of the solute from surrounding fluid.

Various flow mixing systems, typically utilizing a geometrically arranged groove and baffle structure, more effectively provides the gas to the depleted boundary regions. Other turbulent mixing systems include dynamic structures such as impellers located within the fuel flow. However, turbulent mixing may not always be feasible or energetically beneficial as a fully developed turbulent flow may result in an unacceptably high pressure drop in applications that require relatively long fuel channels as typified in an aircraft. Furthermore, geometrically forced mixing structures are relatively difficult to manufacture and may become fouled over a prolonged time.

Accordingly, it is desirable to provide a method and system for the deoxygenation of hydrocarbon fuel, which minimizes coking in an inexpensive, size and weight efficient system which avoids the utilization of geometrically forced mixing structures.

SUMMARY OF THE INVENTION

The fuel system for an energy conversion device according to the present invention includes a deoxygenator system with an acoustic induced flow mixing and gas cavitation system that the fuel deoxygenator system includes a signal generator system that includes a multiple of transducers located adjacent a fuel channel. The transducers are arranged to generate acoustic flow chaotization, destroying oxygen depleted boundary layer and significantly improving flow mixing, intensifying oxygen supply to the surface of the oxygen-removing membrane. At least two excitation transducers situated off-axis apply perturbations to the laminar fuel flow creating liquid torque and intensifying fuel mixing.

Overall fuel degassing is thereby intensified by the present invention through at least the volumetric gas diffusion from liquid to bubble and gas diffusion from the bubble to an oxygen permeable membrane of the fuel deoxygenator system. When the bubble is in contact with membrane, the gas diffusion toward the membrane is controlled by the diffusion coefficient in gas/vapor, which is at least two orders of magnitude larger than gas diffusion in the fuel. Such a bubbling will significantly increase fuel deoxygenation rate and at the same time agitate the boundary layer enhancing the oxygen supply to the depleted boundary layer region.

The present invention therefore provides a method and system for the deoxygenation of hydrocarbon fuel, which minimizes coking in an inexpensive, size and weight efficient system which avoids the utilization of geometrically forced mixing structures.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
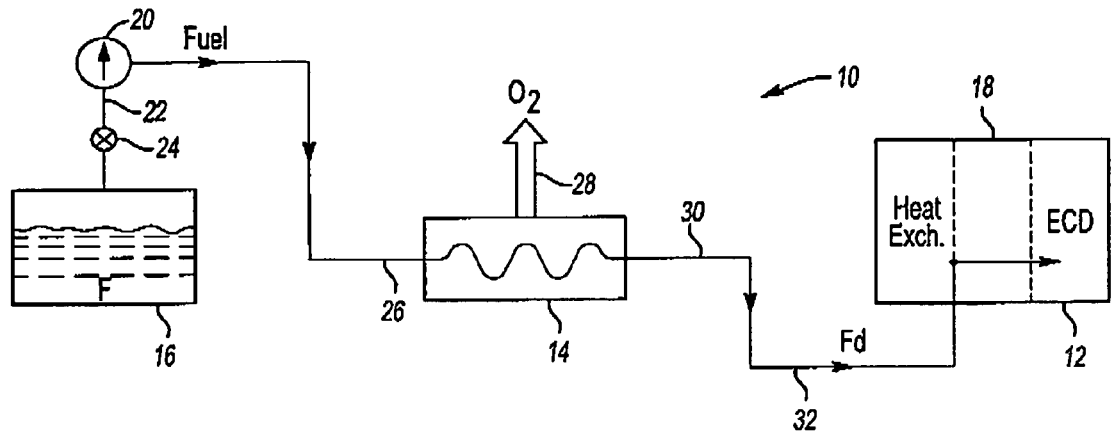
FIG. 1 is a general schematic block diagram of an energy conversion device (ECD) and an associated fuel system employing a fuel deoxygenator in accordance with the present invention.

FIG. 1 illustrates a general perspective view of a fuel system 10 for an energy conversion device (ECD) 12. A deoxygenator system 14 receives liquid fuel F from a reservoir 16. The fuel F is typically a hydrocarbon such as jet fuel. The ECD 12 may exist in a variety of forms in which the fuel, at some point prior to eventual use for processing, for combustion or for some form of energy release, acquires sufficient heat which may support autoxidation reactions and coking if dissolved oxygen is present to any significant extent in the fuel.

One form of the ECD 12 is a gas turbine engine in which fuel is pre-heated to increase heat capacity and is used as a liquid coolant for one or several systems in an aircraft. In any event, fuel becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by pump 20 assists in circulating the fuel F through the deoxygenator system 14 and other portions of the fuel system 10. As the fuel F passes through the deoxygenator system 14, oxygen is selectively removed and is collected and/or expelled from the system 10 at 28.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. It should be understood that although a particular component arrangement is disclosed in the illustrated embodiment, other arrangements will benefit from the instant invention.

Figure 2:
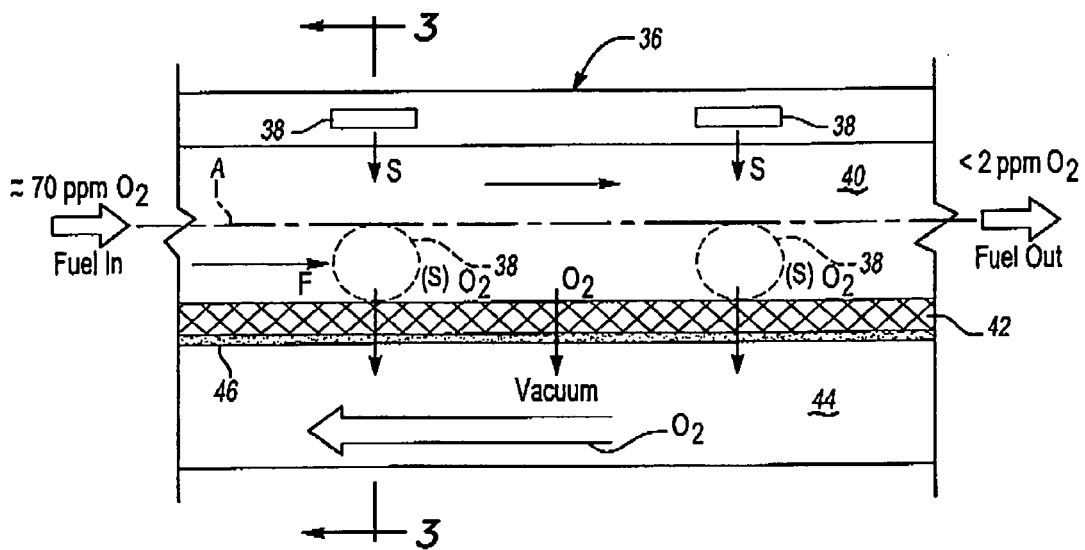
FIG. 2 is a block diagram of the deoxygenator system of the present invention.

Referring to FIG. 2, the deoxygenator system 14 preferably includes a signal generator system 36, which increases the fuel deoxygenation rate by acoustic and/or ultrasound induced stable gas cavitation. The signal generator system 36 preferably includes a multiple of transducers 38 located adjacent a fuel channel 40. It should be understood that the transducers 38 may, for example only, be attached to the fuel channel walls and/or to the micro channel start and/or end plates within the deoxygenator system 14 (FIG. 1).

In operation, fuel flowing through the fuel channel 40 in the direction of arrow F are caused to change direction and mix by the signal generator system 36 and contact a permeable membrane 42. Vacuum creates an oxygen partial pressure differential between the inner walls of the fuel passage 40 and the oxygen permeable membrane 42 which causes diffusion of oxygen dissolved within the fuel to migrate through a porous substrate 46 which supports the membrane 42 and out of the deoxygenator system 14 through an oxygen transport passage 44 separate from the fuel channel 40. In the micro channel, fully filled with the fuel stream, the concentration of the flammable volatiles is minimized and oxygen is removed through an oxygen permeable membrane 42 (by pressure difference across the membrane) immediately after bubble discharge on the membrane wall.

It should be understood that the fuel channel 40 disclosed in the illustrated embodiment is exemplary and the fuel channel 40 may be a micro-channel within a membrane based fuel deoxygenator system, a conduit, a passage, and/or any other fuel communication system other than a fuel tank 16 (FIG. 1). For further understanding of other aspects of one membrane based fuel deoxygenator system and associated components thereof, attention is directed to U.S. Pat. No. 6,315,815 and U.S. patent application Ser. No.: 10/407, 004 entitled PLANAR MEMBRANE DEOXYGENATOR which are assigned to the assignee of the instant invention and which are hereby incorporated herein in their entirety.

The transducers 38 are arranged to generate acoustic flow chaotization, destroying oxygen depleted boundary layer and significantly improving flow mixing, intensifying oxygen supply to the surface of the oxygen-removing membrane. Typical excitation frequency domain for chaotic mixing of 10 KHz–1 MHz depending on channel geometry.

Figure 3:
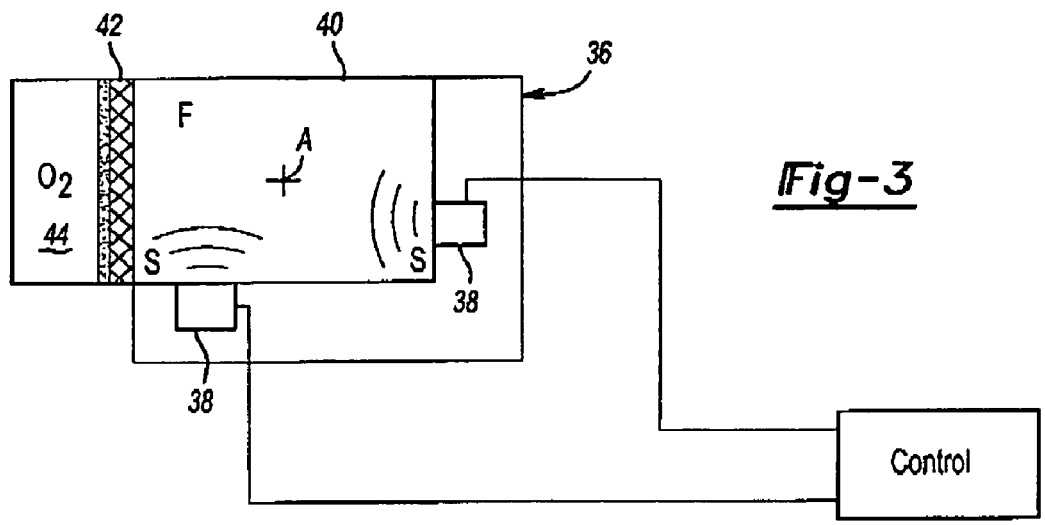
FIG. 3 is a sectional view of a signal generator system adjacent a fuel flow path taken along line 3—3 in FIG. 2.

Preferably, the transducers 38 are arranged in off-axial positions off a central axis A with respect to the fuel channel 40. The transducers 38 are angled relative to each other to cause effective mixing (also illustrated in FIG. 3).

The transducers 38 cause acoustic/ultrasound signals S within the fuel channel 40. The signals S generate acoustic flow chaotization, destroying oxygen depleted boundary layer and significantly improving flow mixing, intensifying oxygen supply to the surface of the oxygen-removing membrane 42.

The transducer signals impact fuel flow either as a continuous signal or as repetitive series of pulses. A control system operates to adjust relative phases of adjacent transducers 38 in order to enhance/optimize the overall mixing effect.

Figure 4:
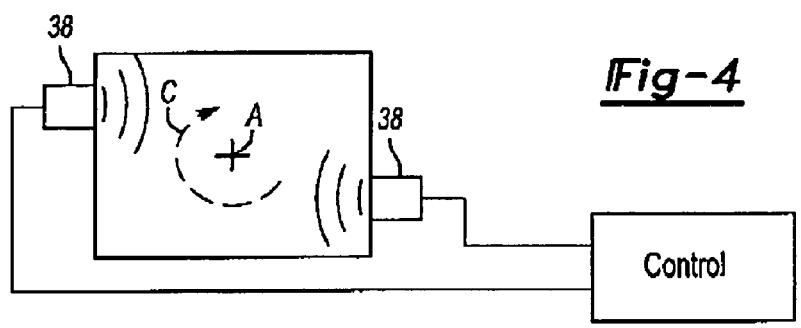
FIG. 4 is a sectional view of a signal generator system adjacent a fuel flow.

The transducers 38 also operate to create liquid torque and cavitation-induced phase separation within the liquid fuel that was initially in laminar flow (illustrated schematically by arrow C within FIG. 4).

Overall fuel degassing is thereby intensified by the present invention through at least the volumetric gas diffusion from liquid to bubble and gas diffusion from the bubble to the membrane 42. When the bubble is in contact with membrane 42, the gas diffusion toward the membrane 42 is controlled by diffusion coefficient in gas/vapor, which is at least two orders of magnitude larger than gas diffusion in the fuel. Cavitation in an ultrasonic field occurs when acoustic pressure causes phase separations and oxygen dissolved in the fuel diffuse into bubbles. Bubbles move with the stream and especially will adhere to the channel member surface discharging with high rate. Such a bubbling will significantly increase fuel deoxygenation rate and at the same time agitate the boundary layer enhancing the oxygen supply to the depleted boundary layer region.

Figure 5:
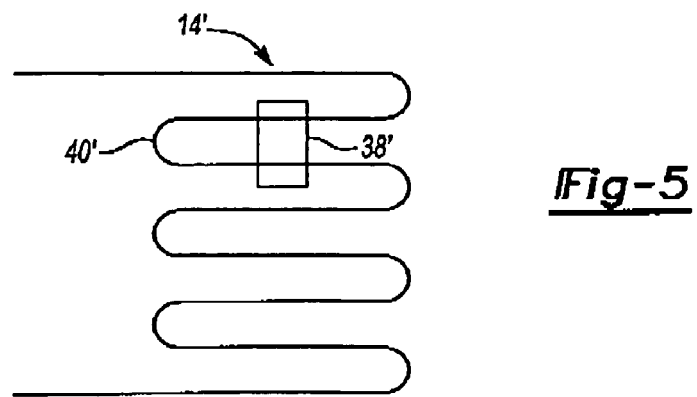
FIG. 5 is an expanded view of an interdigitated deoxygenator system according to the present invention.

Referring to FIG. 5, a serpentine deoxygenator system 14' may alternatively or additionally locate the transducers 38' to serve as a disturbance source for a multiple of adjacent fuel channel 40' common to the deoxygenator system 14'.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention

What is claimed is:

1. A fuel system comprising:
   a fuel channel which defines a central axis along a fuel flow path;
   a first transducer located adjacent said fuel channel off said axis and directed toward said fuel channel to direct a signal transverse to and off said axis; and
   a second transducer located adjacent said fuel channel off said axis and directed toward said fuel channel to direct a signal transverse to and off said axis.

2. The fuel system as recited in claim 1, wherein said first transducer is angled to said second transducer.

3. The fuel system as recited in claim 1, wherein said first transducer and said second transducer are acoustic transducers which generate an acoustic signal.

4. A fuel system comprising:
   a fuel channel which defines an axis;
   an oxygen permeable membrane in communication with said fuel channel;
   a first transducer located adjacent said fuel channel and off said axis; and
   a second transducer located adjacent said fuel channel and off said axis.

5. A fuel system comprising:
a fuel channel which defines an axis, said fuel channel comprises a system of micro-channels;
an oxygen permeable membrane in communication with said fuel channel;
a first transducer located adjacent said fuel channel and off said axis; and
a second transducer located adjacent said fuel channel and off said axis.

6. The fuel system as recited in claim 5, wherein said micro-channels are located within a fuel deoxygenation system.

7. A method of reducing dissolved oxygen from within a fuel system comprising the steps of:
(1) generating acoustic flow chaotization within a liquid fuel containing a dissolved oxygen to intensify oxygen from within the liquid fuel to a surface of an oxygen-permeable membrane.

8. A method as recited in claim 7, further comprising the steps of:
locating a first transducer off an axis defined by a fuel channel transporting the liquid fuel containing the dissolved oxygen.

9. A method as recited in claim 8, further comprising the steps of:
locating a second transducer off an axis defined by the fuel channel transporting the liquid fuel containing the dissolved oxygen, the second transducer angled relative to the first transducer.

10. A method as recited in claim 7, further comprising the steps of:
locating a first and second transducer off an axis defined by a fuel channel transporting the liquid fuel containing the dissolved oxygen; and
locating the first and second transducer in communication with a liquid in contact with the fuel channel.

11. A method as recited in claim 7, further comprises the steps of:
(2) communicating oxygen through the oxygen-permeable membrane, the oxygen-permeable membrane in communication with a fuel deoxygenation system.

12. A method as recited in claim 11, wherein said step (2) further comprises the steps of:
reducing the dissolved oxygen concentration within the fuel to below 2 ppm.

13. A method as recited in claim 7, further comprising the steps of:
(2) generating cavitation-induced phase separation within the liquid fuel.

14. A method as recited in claim 13, further comprises the steps of:
(3) communicating oxygen produced by the cavitation-induced phase separation through an oxygen-permeable membrane, the oxygen-permeable membrane in communication with a fuel deoxygenation system.

15. A method as recited in claim 14, wherein a first transducer and a second transducer generate the acoustic flow chaotization within a fuel channel to intensify oxygen supply to the surface of the oxygen-permeable membrane.

16. A method as recited in claim 7, where said step (1) further comprises:
(a) generating an ultrasonic signal as a series of repetitive pulses within the liquid fuel.

* * * * *